(12) United States Patent
Batchelder (10) Patent No.: US 11,203,150 B2
(45) Date of Patent: Dec. 21, 2021

(54) LAYER ORIENTATION IN SELECTIVE DEPOSITION BASED ADDITIVE MANUFACTURING OF PARTS

(71) Applicant: Evolve Additive Solutions, Inc., Minnetonka, MN (US)

(72) Inventor: J. Samuel Batchelder, Somers, NY (US)

(73) Assignee: Evolve Additive Solutions, Inc., Minnetonka, MN (US)

(*) Notice: Subject to any disclaimer, the term of this patent is extended or adjusted under 35 U.S.C. 154(b) by 426 days.

(21) Appl. No.: 16/235,587

(22) Filed: Dec. 28, 2018

(65) Prior Publication Data

US 2019/0202113 A1    Jul. 4, 2019

Related U.S. Application Data

(60) Provisional application No. 62/612,077, filed on Dec. 29, 2017.

(51) Int. Cl.

| | |
|---|---|
| *B29C 64/153* | (2017.01) |
| *B29C 64/295* | (2017.01) |
| *B29C 64/245* | (2017.01) |
| *B29C 64/393* | (2017.01) |
| *B33Y 50/02* | (2015.01) |

(Continued)

(52) U.S. Cl.
CPC .......... *B29C 64/153* (2017.08); *B29C 64/223* (2017.08); *B29C 64/245* (2017.08); *B29C 64/295* (2017.08); *B29C 64/393* (2017.08); *B33Y 50/02* (2014.12); *B29C 64/176* (2017.08); *B29C 64/35* (2017.08); *B33Y 10/00* (2014.12); *B33Y 30/00* (2014.12)

(58) Field of Classification Search
CPC ... B29C 64/153; B29C 64/147; B29C 64/223; B29C 64/393; B33Y 10/00; B33Y 30/00; B33Y 50/02

See application file for complete search history.

(56) References Cited

U.S. PATENT DOCUMENTS

| | | |
|---|---|---|
| 8,123,999 B2 | 2/2012 | Priedeman, Jr. et al. |
| 8,246,888 B2 | 8/2012 | Hopkins et al. |

(Continued)

*Primary Examiner* — Timothy Kennedy
*Assistant Examiner* — Jerzi H Moreno Hernandez
(74) *Attorney, Agent, or Firm* — Pauly, DeVries Smith & Deffner LLC (57) ABSTRACT

A method of producing a 3D part using a selective deposition based additive manufacturing system can include developing a first layer using at least one electrostatography engine, determining a first cross-track offset distance between an average cross-track symmetry line of the first layer and a centerline of a transfer medium, transferring the first layer to the transfer medium such that the average cross-track symmetry line of the first layer is aligned with the centerline of the transfer medium, moving a build platform relative to the transfer medium in the cross-track direction to align the first layer on a part build surface, and transfusing the first layer on the build platform using a transfusion assembly to build the part in a layer-by-layer manner. The first layer comprises at least one of a part material and a support material. The first cross-track offset distance is measured in a cross-track direction perpendicular to an in-track direction of movement of the transfer medium.

19 Claims, 7 Drawing Sheets

(51) Int. Cl.
  *B29C 64/223*  (2017.01)
  *B29C 64/176*  (2017.01)
  *B33Y 30/00*  (2015.01)
  *B29C 64/35*  (2017.01)
  *B33Y 10/00*  (2015.01)

(56) References Cited

U.S. PATENT DOCUMENTS

| | | |
|---|---|---|
| 8,459,280 B2 | 6/2013 | Swanson et al. |
| 8,488,994 B2 | 7/2013 | Hanson et al. |
| 8,765,045 B2 | 7/2014 | Zinniel |
| 8,879,957 B2 | 11/2014 | Hanson et al. |
| 2011/0186081 A1 | 8/2011 | Dunn et al. |
| 2013/0186549 A1 | 7/2013 | Comb et al. |
| 2013/0186558 A1 | 7/2013 | Comb et al. |
| 2017/0210070 A1* | 7/2017 | Sreekumar .............. B29C 64/40 |
| 2017/0299973 A1* | 10/2017 | Frauens ................ G03G 15/224 |

* cited by examiner

LAYER ORIENTATION IN SELECTIVE DEPOSITION BASED ADDITIVE MANUFACTURING OF PARTS

CROSS REFERENCE TO RELATED APPLICATION(S)

The present application claims the benefit of U.S. Provisional Patent Application Ser. No. 62/612,077 entitled LAYER ORIENTATION IN ELECTROSTATOGRAPHY-BASED ADDITIVE MANUFACTURING OF PARTS that was filed on Dec. 29, 2017, the contents of which is incorporated by reference in its entirety.

BACKGROUND

The present disclosure relates to additive manufacturing systems for producing three-dimensional (3D) parts and support structures. In particular, the present disclosure relates to electrostatography-based additive manufacturing systems for producing 3D parts, and methods of producing 3D parts using the systems.

Additive manufacturing systems are used to build 3D parts from digital representations of the 3D parts (e.g., AMF and STL format files) using one or more additive manufacturing techniques. Examples of additive manufacturing techniques include extrusion-based techniques, ink jetting, selective laser sintering, powder/binder jetting, electron-beam melting, stereolithographic, and electrophotographic processes. For each of these techniques, the digital representation of the 3D part is initially sliced into multiple horizontal layers. For each sliced layer, a tool path is then generated, which provides instructions for the particular additive manufacturing system to form the given layer.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In an electrophotographic 3D printing or production process, each slice of the digital representation of the 3D part is printed or developed using an electrophotographic engine. The electrophotographic engine generally operates in accordance with 2D electrophotographic printing processes, but with a polymeric toner. The electrophotographic engine typically uses a conductive support drum that is coated with a photoconductive material layer, where latent electrostatic images are formed by electrostatic charging, followed by image-wise exposure of the photoconductive layer by an optical source. The latent electrostatic images are then moved to a developing station where the polymeric toner is applied to charged areas, or alternatively to discharged areas of the photoconductive insulator to form the layer of the polymeric toner representing a slice of the 3D part. The developed layer is transferred to a transfer medium, from which successive layers are transfused to previously printed layers with heat and/or pressure to build the 3D part.

In addition to the aforementioned commercially available additive manufacturing techniques, a novel additive manufacturing technique has emerged, where particles are first selectively deposited in an imaging process, forming a layer corresponding to a slice of the part to be made; the layers are then bonded to each other, forming a part. This is a selective deposition process, in contrast to, for example, selective sintering, where the imaging and part formation happens simultaneously. The imaging step in a selective deposition process can be done using electrophotography. In two-dimensional (2D) printing, electrophotography (i.e., xerography) is a popular technology for creating 2D images on planar substrates, such as printing on paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

SUMMARY

In one aspect, the present disclosure is directed to a method of producing a 3D part using an selective deposition based additive manufacturing system can include developing a first layer using at least one electrostatography engine, determining a first cross-track offset distance between an average cross-track symmetry line of the first layer and a centerline of a transfer medium, transferring the first layer to the transfer medium such that the average cross-track symmetry line of the first layer is substantially aligned with the centerline of the transfer medium, moving a build platform relative to the transfer medium in a cross-track direction to align the first layer on a part build surface, and transfusing the first layer on the build platform using a transfusion assembly to build the part in a layer-by-layer manner. The first layer comprises at least one of a part material and a support material. The first cross-track offset distance is measured in the cross-track direction substantially perpendicular to an in-track direction of movement of the transfer medium.

In another aspect, a method of producing a 3D part using a selective deposition additive manufacturing system includes determining a location of an average cross-track symmetry line of a first layer based on an area of the first layer in a plane defined by axes for a cross-track direction and an in-track direction substantially perpendicular to the cross-track direction and averaged along an overall in-track dimension of the first layer, determining a first cross-track offset distance between the average cross-track symmetry line of the first layer and a centerline of a flexible transfer medium, developing the first layer using at least one electrostatography engine, transferring the first layer to the transfer medium such that the average cross-track symmetry line for the first layer is substantially aligned with the centerline of the transfer medium, conveying the first layer from the at least one electrostatography engine to a transfusion assembly by moving the transfer medium in the in-track direction such that the average cross-track symmetry line of the first layer remains aligned with the centerline of the transfer medium while being conveyed, moving a build platform relative to the transfer medium in the cross-track direction to align the first layer on a part build surface, and transfusing the first layer on the build platform using the transfusion assembly to build the part in a layer-by-layer manner. The first layer comprises at least one of a part material and a support material. The first layer is at a higher temperature than the transfer medium when the first layer is transferred to the transfer medium. A build platform centerline that extends substantially in the in-track direction is offset from the centerline of the transfer medium while transfusing the first layer.

The present summary is provided only by way of example, and not limitation. Other aspects of the present invention will be appreciated in view of the entirety of the present disclosure, including the entire text, claims and accompanying figures.

Definitions

Unless otherwise specified, the following terms as used herein have the meanings provided below:

The term "copolymer" refers to a polymer having two or more monomer species, and includes terpolymers (i.e., copolymers having three monomer species).

The terms "at least one" and "one or more of" an element are used interchangeably, and have the same meaning that includes a single element and a plurality of the elements, and may also be represented by the suffix "(s)" at the end of the element. For example, "at least one polyimide", "one or more polyamides", and "polyamide(s)" may be used interchangeably and have the same meaning.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "in-track direction" is in reference to a direction substantially aligned with a feed direction of a transfer medium, also sometimes referred to as the X direction. The term "cross-track direction" is in reference to a direction substantially perpendicular to the in-track direction, also sometimes referred to as the Y direction.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

The term "selective deposition" refers to an additive manufacturing technique where one or more layers of particles are fused to previously deposited layers utilizing heat and pressure over time where the particles fuse together to form a layer of the part and also fuse to the previously printed layer.

The term "electrostatography" refers to the formation and utilization of latent electrostatic charge patterns to form an image of a layer of a part, a support structure or both on a surface. Electrostatography includes, but is not limited to, electrophotography where optical energy is used to form the latent image, ionography where ions are used to form the latent image and/or electron beam imaging where electrons are used to form the latent image.

All references cited herein are incorporated by reference in their entireties.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to selected deposition based additive manufacturing systems for printing 3D parts, and methods of printing 3D parts using such systems. As mentioned above, during a selective deposition 3D part additive manufacturing or printing operation, an electrostatography engine can develop each layer of the 3D part (and any associated support material) out of a polymeric toner or powder-based material using an electrophotographic process. The developed layers are then transferred to a transfer medium (e.g., a flexible belt), which conveys the layers to a transfusion assembly where those layers are transfused (e.g., using heat and/or pressure) to build a 3D part and support structures in a layer-by-layer manner.

While the present disclosure can be utilized with any electrostatography-based additive manufacturing system, the present disclosure will be described in association in an electrophotography-based (EP) additive manufacturing system. However, the present disclosure is not limited to an EP based additive manufacturing system and can be utilized with any electrostatography-based additive manufacturing system.

The cross-track deviations of the transfer medium in some electrophotographic additive manufacturing systems are typically low. For instance, a loop of a spliced belt transfer medium of several 600 dot per inch (dpi) voxels, and a y-axis, cross-track position of such a belt at a specific intra-loop position repeats to a precision on the order of a voxel. This precision can simplify overlay and registration during transfusion.

However, it has been discovered that the transfer medium may deform under some conditions, often due to thermal expansion differentials and varying tensions that are related to orientations of developed layers supported on the transfer medium, causing undesirable tracking errors as the transfer medium delivers developed layers for transfusion. It is desired to reduce transfer medium tracking error to increase accuracy and control of the transfusion processes. As discussed below, images generated within the EP engine(s) and layers of material developed from those images can be oriented on the transfer medium to reduce asymmetric in-track tension and/or deformation (especially frusto-conical deformation) in the transfer medium.

Figure 1:
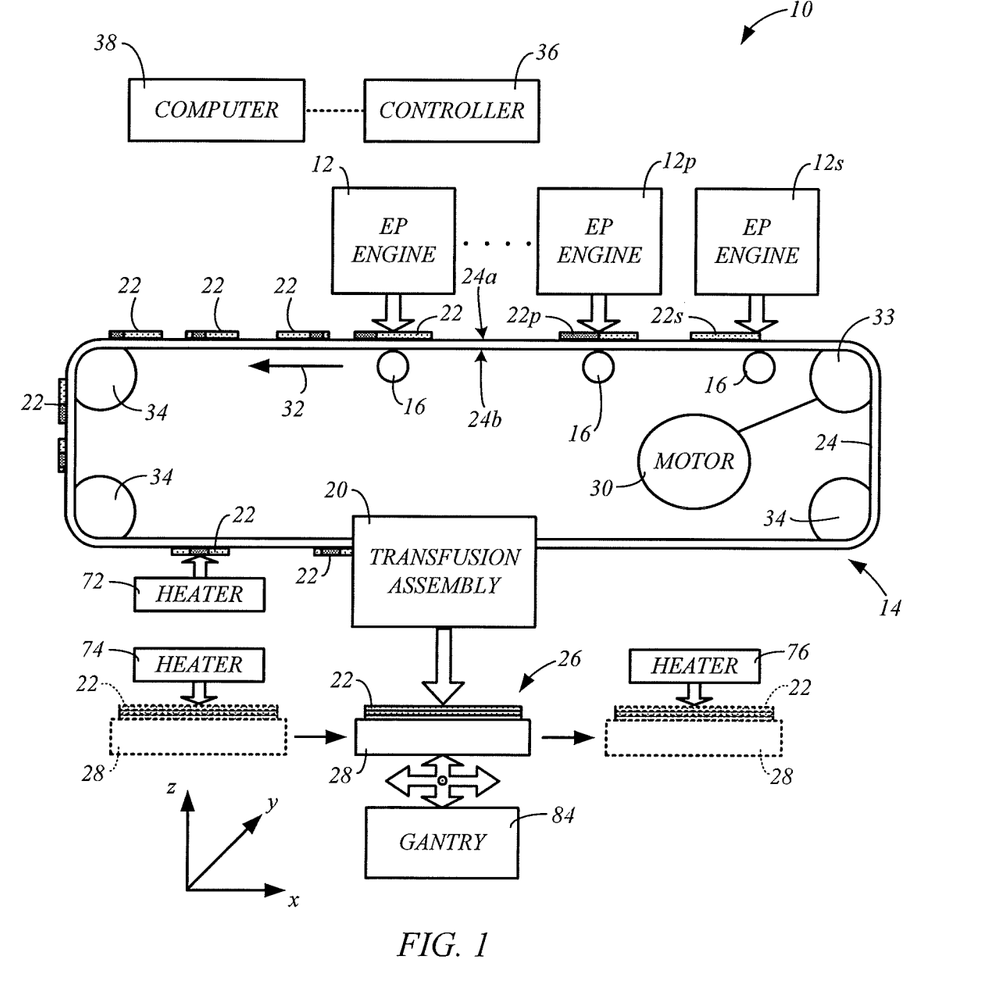
FIG. 1 is a simplified diagram of an example selective deposition based additive manufacturing system for printing 3D parts and associated support structures, in accordance with embodiments of the present disclosure.

FIG. 1 is a simplified diagram of an example electrophotography-based additive manufacturing system 10 for printing 3D parts and associated support structures, in accordance with embodiments of the present disclosure. As shown in FIG. 1, system 10 includes one or more EP engines, generally referred to as 12, such as EP engines 12p and 12s, a transfer assembly 14, biasing mechanisms 16, and a transfusion assembly 20. Examples of suitable components and functional operations for system 10 include those disclosed in Hanson et al., U.S. Pat. Nos. 8,879,957 and 8,488,994, and in Comb et al., U.S. Patent Publication Nos. 2013/0186549 and 2013/0186558.

The EP engines 12p and 12s are imaging engines for respectively imaging or otherwise developing layers, generally referred to as 22, of the powder-based part and support materials, where the part and support materials are each preferably engineered for use with the particular architecture of the EP engine 12p or 12s. As discussed below, the developed layers 22 are transferred to a transfer medium 24 of the transfer assembly 14, which delivers the layers 22 to the transfusion assembly 20. The transfusion assembly 20 operates to build the 3D part 26, which may include support structures and other features, in a layer-by-layer manner by transfusing the layers 22 together on a build platform 28.

In some embodiments, the transfer medium 24 includes a belt, as shown in FIG. 1. Examples of suitable transfer belts for the transfer medium 24 include those disclosed in Comb et al., U.S. Patent Application Publication Nos. 2013/0186549 and 2013/0186558. In some embodiments, the belt 24 includes front surface 24a and rear surface 24b, where front surface 24a faces the EP engines 12, and the rear surface 24b is in contact with the biasing mechanisms 16.

In some embodiments, the transfer assembly 14 includes one or more drive mechanisms that include, for example, a motor 30 and a drive roller 33, or other suitable drive mechanism, and operate to drive the transfer medium or belt 24 in a feed direction 32. In some embodiments, the transfer assembly 14 includes idler rollers 34 that provide support for the belt 24. The example transfer assembly 14 illustrated in FIG. 1 is highly simplified and may take on other configurations. Additionally, the transfer assembly 14 may include additional components that are not shown in order to simplify the illustration, such as, for example, components for maintaining a desired tension in the belt 24, a belt cleaner for removing debris from the surface 24a that receives the layers 22, and other components.

The EP engine 12s develops layers of powder-based support material, and the EP engine 12p develops layers of powder-based part/build material. In some embodiments, the EP engine 12s is positioned upstream from the EP engine 12p relative to the feed direction 32, as shown in FIG. 1. In alternative embodiments, the arrangement of the EP engines 12p and 12s may be reversed such that the EP engine 12p is upstream from the EP engine 12s relative to the feed direction 32. In further alternative embodiments, system 10 may include three or more EP engines 12 for printing layers of additional materials, as indicated in FIG. 1.

System 10 also includes controller 36, which represents one or more processors that are configured to execute instructions, which may be stored locally in memory of the system 10 or in memory that is remote to the system 10, to control components of the system 10 to perform one or more functions described herein. In some embodiments, the controller 36 includes one or more control circuits, microprocessor-based engine control systems, and/or digitally-controlled raster imaging processor systems, and is configured to operate the components of system 10 in a synchronized manner based on printing instructions received from a host computer 38 or a remote location. In some embodiments, the host computer 38 includes one or more computer-based systems that are configured to communicate with controller 36 to provide the print instructions (and other operating information). For example, the host computer 38 may transfer information to the controller 36 that relates to the sliced layers of the 3D parts and support structures, thereby allowing the system 10 to print the 3D parts 26 and support structures in a layer-by-layer manner.

The components of system 10 may be retained by one or more frame structures (not shown for simplicity). Additionally, the components of system 10 may be retained within an enclosable housing (not shown for simplicity) that prevents components of the system 10 from being exposed to ambient light during operation.

Figure 2:
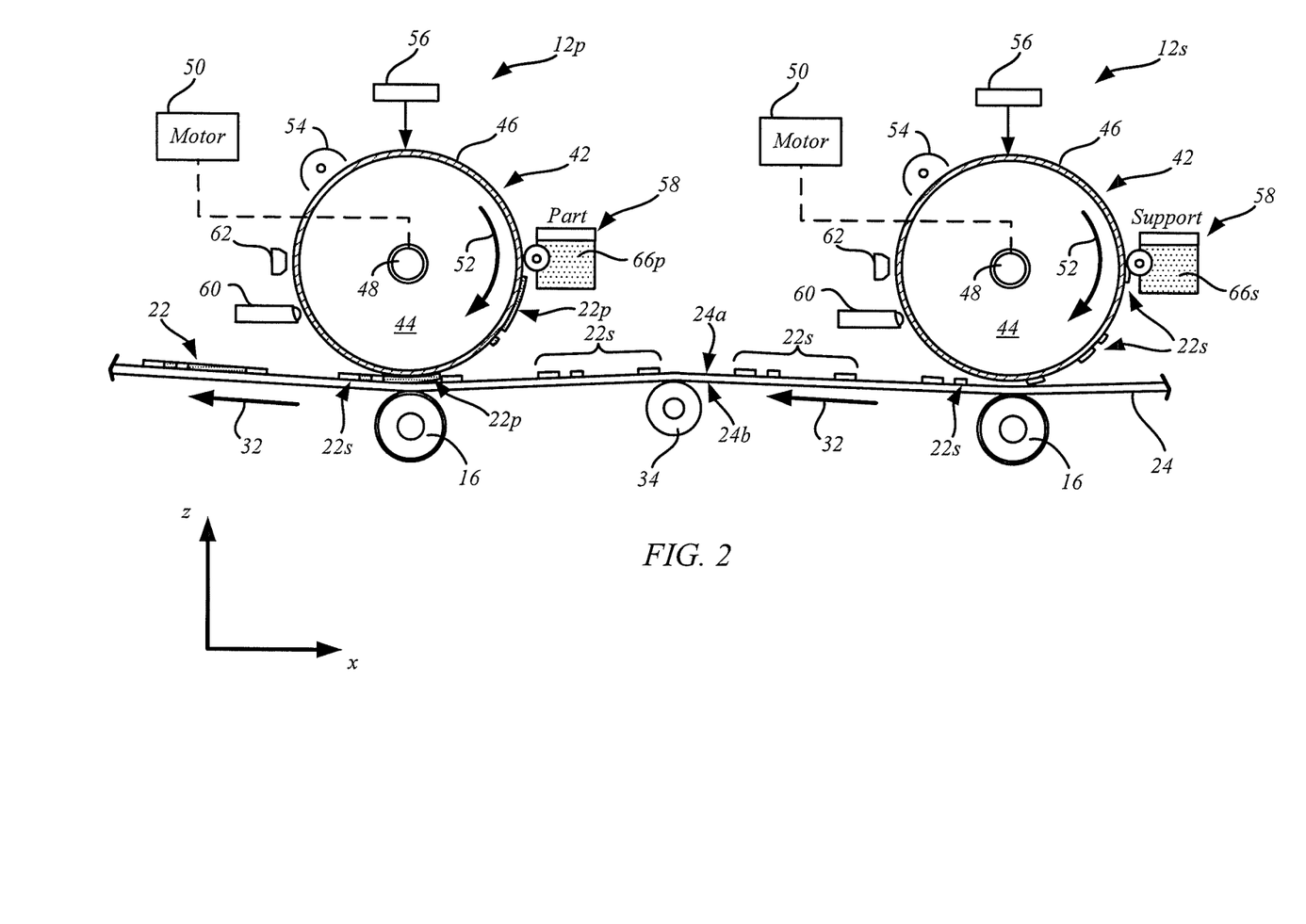
FIG. 2 is a schematic front view of a pair of example electrophotography engines of the system for developing layers of the part and support materials.

FIG. 2 is a schematic front view of the EP engines 12s and 12p of the system 10, in accordance with example embodiments of the present disclosure. In the illustrated embodiment, the EP engines 12p and 12s may include the same components, such as a photoconductor drum 42 having a conductive drum body 44 and a photoconductive surface 46. The conductive drum body 44 is an electrically-conductive drum (e.g., fabricated from copper, aluminum, tin, or the like) that is electrically grounded and configured to rotate around a shaft 48. The shaft 48 is correspondingly connected to a drive motor 50, which is configured to rotate the shaft 48 (and the photoconductor drum 42) in the direction of arrow 52 at a constant rate.

The photoconductive surface 46 is a thin film extending around the circumferential surface of the conductive drum body 44, and is preferably derived from one or more photoconductive materials, such as amorphous silicon, selenium, zinc oxide, organic materials, and the like. As discussed below, the surface 46 is configured to receive latent-charged images of the sliced layers of a 3D part or support structure (or negative images), and to attract charged particles of the part or support material to the charged or discharged image areas, thereby creating the layers of the 3D part or support structure.

As further shown, each of the example EP engines 12p and 12s also includes a charge inducer 54, an imager 56, a development station 58, a cleaning station 60, and a discharge device 62, each of which may be in signal communication with the controller 36. The charge inducer 54, the imager 56, the development station 58, the cleaning station 60, and the discharge device 62 accordingly define an image-forming assembly for the surface 46 while the drive motor 50 and the shaft 48 rotate the photoconductor drum 42 in the direction 52.

Each of the EP engines 12 uses the powder-based material (e.g., polymeric or thermoplastic toner), generally referred to herein by reference character 66, to develop or form the layers 22. In some embodiments, the image-forming assembly for the surface 46 of the EP engine 12s is used to form support layers 22s of powder-based support material 66s, where a supply of the support material 66s may be retained by the development station 58 (of the EP engine 12s) along with carrier particles. Similarly, the image-forming assembly for the surface 46 of the EP engine 12p is used to form part layers 22p of powder-based part material 66p, where a supply of the part material 66p may be retained by the development station 58 (of the EP engine 12p) along with carrier particles.

The charge inducer 54 is configured to generate a uniform electrostatic charge on the surface 46 as the surface 46 rotates in the direction 52 past the charge inducer 54. Suitable devices for the charge inducer 54 include corotrons, scorotrons, charging rollers, and other electrostatic charging devices.

Each imager 56 is a digitally-controlled, pixel-wise light exposure apparatus configured to selectively emit electromagnetic radiation toward the uniform electrostatic charge on the surface 46 as the surface 46 rotates in the direction 52 the past imager 56. The selective exposure of the electromagnetic radiation to the surface 46 is directed by the controller 36, and causes discrete pixel-wise locations of the electrostatic charge to be removed (i.e., discharged to ground), thereby forming latent image charge patterns on the surface 46.

Suitable devices for the imager 56 include scanning laser (e.g., gas or solid-state lasers) light sources, light emitting diode (LED) array exposure devices, and other exposure device conventionally used in 2D electrophotography systems. In alternative embodiments, suitable devices for the charge inducer 54 and the imager 56 include ion-deposition systems configured to selectively directly deposit charged ions or electrons to the surface 46 to form the latent image charge pattern.

Each development station 58 is an electrostatic and magnetic development station or cartridge that retains the supply of the part material 66p or the support material 66s, along with carrier particles. The development stations 58 may function in a similar manner to single or dual component development systems and toner cartridges used in 2D electrophotography systems. For example, each development station 58 may include an enclosure for retaining the part material 66p or the support material 66s and carrier particles. When agitated, the carrier particles generate triboelectric charges to attract the powders of the part material 66p or the support material 66s, which charges the attracted powders to a desired sign and magnitude, as discussed below.

Each development station 58 may also include one or more devices for transferring the charged part or the support material 66p or 66s to the surface 46, such as conveyors, fur brushes, paddle wheels, rollers, and/or magnetic brushes. For instance, as the surface 46 (containing the latent charged image) rotates from the imager 56 to the development station 58 in the direction 52, the charged part material 66p or the support material 66s is attracted to the appropriately charged regions of the latent image on the surface 46, utilizing either charged area development or discharged area development (depending on the electrophotography mode being utilized). This creates successive layers 22p or 22s as the photoconductor drum 12 continues to rotate in the direction 52, where the successive layers 22p or 22s correspond to the successive sliced layers of the digital representation of the 3D part or support structure.

The successive layers 22p or 22s are then rotated with the surface 46 in the direction 52 to a transfer region in which layers 22p or 22s are successively transferred from the photoconductor drum 42 to the belt 24 or other transfer medium, as discussed below. While illustrated as a direct engagement between the photoconductor drum 42 and the belt 24, in some preferred embodiments, the EP engines 12p and 12s may also include intermediary transfer drums and/or belts, as discussed further below.

After a given layer 22p or 22s is transferred from the photoconductor drum 42 to the belt 24 (or an intermediary transfer drum or belt), the drive motor 50 and the shaft 48 continue to rotate the photoconductor drum 42 in the direction 52 such that the region of the surface 46 that previously held the layer 22p or 22s passes the cleaning station 60. The cleaning station 60 is a station configured to remove any residual, non-transferred portions of part or support material 66p or 66s. Suitable devices for the cleaning station 60 include blade cleaners, brush cleaners, electrostatic cleaners, vacuum-based cleaners, and combinations thereof.

After passing the cleaning station 60, the surface 46 continues to rotate in the direction 52 such that the cleaned regions of the surface 46 pass the discharge device 62 to remove any residual electrostatic charge on the surface 46, prior to starting the next cycle. Suitable devices for the discharge device 62 include optical systems, high-voltage alternating-current corotrons and/or scorotrons, one or more rotating dielectric rollers having conductive cores with applied high-voltage alternating-current, and combinations thereof.

The biasing mechanisms 16 are configured to induce electrical potentials through the belt 24 to electrostatically attract the layers 22p and 22s from the EP engines 12p and 12s to the belt 24. Because the layers 22p and 22s are each only a single layer increment in thickness at this point in the process, electrostatic attraction is suitable for transferring the layers 22p and 22s from the EP engines 12p and 12s to the belt 24.

The controller 36 preferably rotates the photoconductor drums 36 of the EP engines 12p and 12s at the same rotational rates that are synchronized with the line speed of the belt 24 and/or with any intermediary transfer drums or belts. This allows the system 10 to develop and transfer the layers 22p and 22s in coordination with each other from separate developer images. In particular, as shown, each part layer 22p may be transferred to the belt 24 with proper registration with each support layer 22s to produce a combined part and support material layer, which is generally designated as layer 22. As can be appreciated, some of the layers 22 transferred to the layer transfusion assembly 20 may only include support material 66s or may only include part material 66p, depending on the particular support structure and 3D part geometries and layer slicing.

In an alternative embodiment, the part layers 22p and the support layers 22s may optionally be developed and transferred along the belt 24 separately, such as with alternating layers 22p and 22s. These successive, alternating layers 22p and 22s may then be transferred to layer transfusion assembly 20, where they may be transfused separately to print or build the 3D part 26 and support structure.

Figure 3:
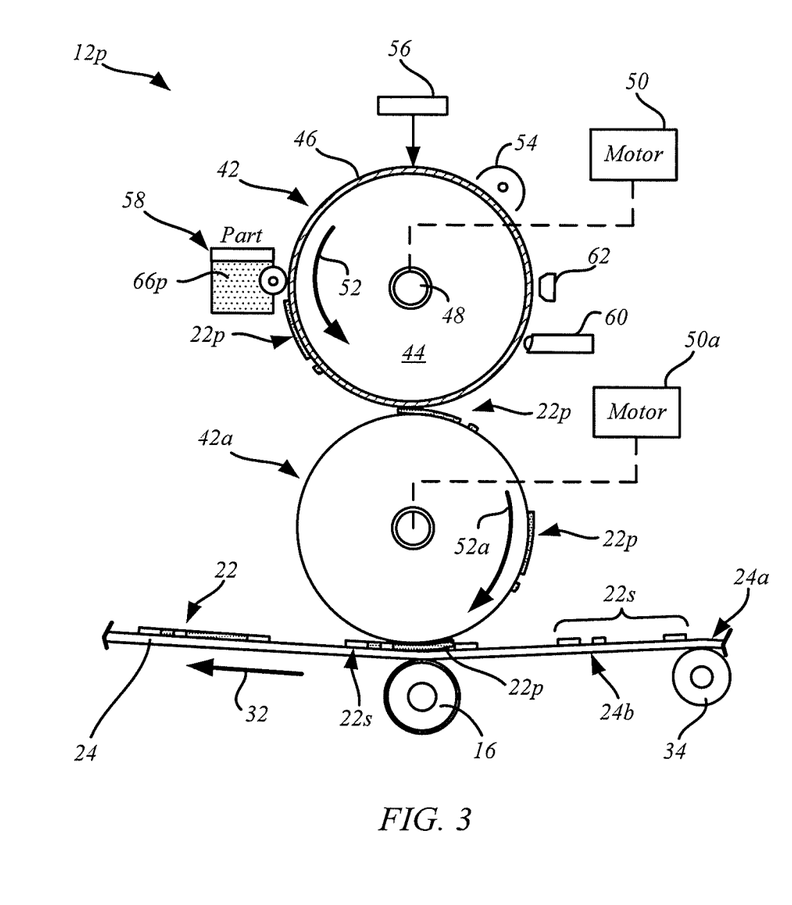
FIG. 3 is a schematic front view of an example electrophotography engine, which includes an intermediary drum or belt.

In a further alternative embodiment, one or both of the EP engines 12p and 12s may also include one or more intermediary transfer drums and/or belts between the photoconductor drum 42 and the belt or transfer medium 24. For example, as shown in FIG. 3, the EP engine 12p may also include an intermediary drum 42a that rotates in the direction 52a that opposes the direction 52, in which drum 42 is rotated, under the rotational power of motor 50a. The intermediary drum 42a engages with the photoconductor drum 42 to receive the developed layers 22p from the photoconductor drum 42, and then carries the received developed layers 22p and transfers them to the belt 24.

The EP engine 12s may include the same arrangement of an intermediary drum 42a for carrying the developed layers 22s from the photoconductor drum 42 to the belt 24. The use of such intermediary transfer drums or belts for the EP engines 12p and 12s can be beneficial for thermally isolating the photoconductor drum 42 from the belt 24, if desired.

Figure 4:
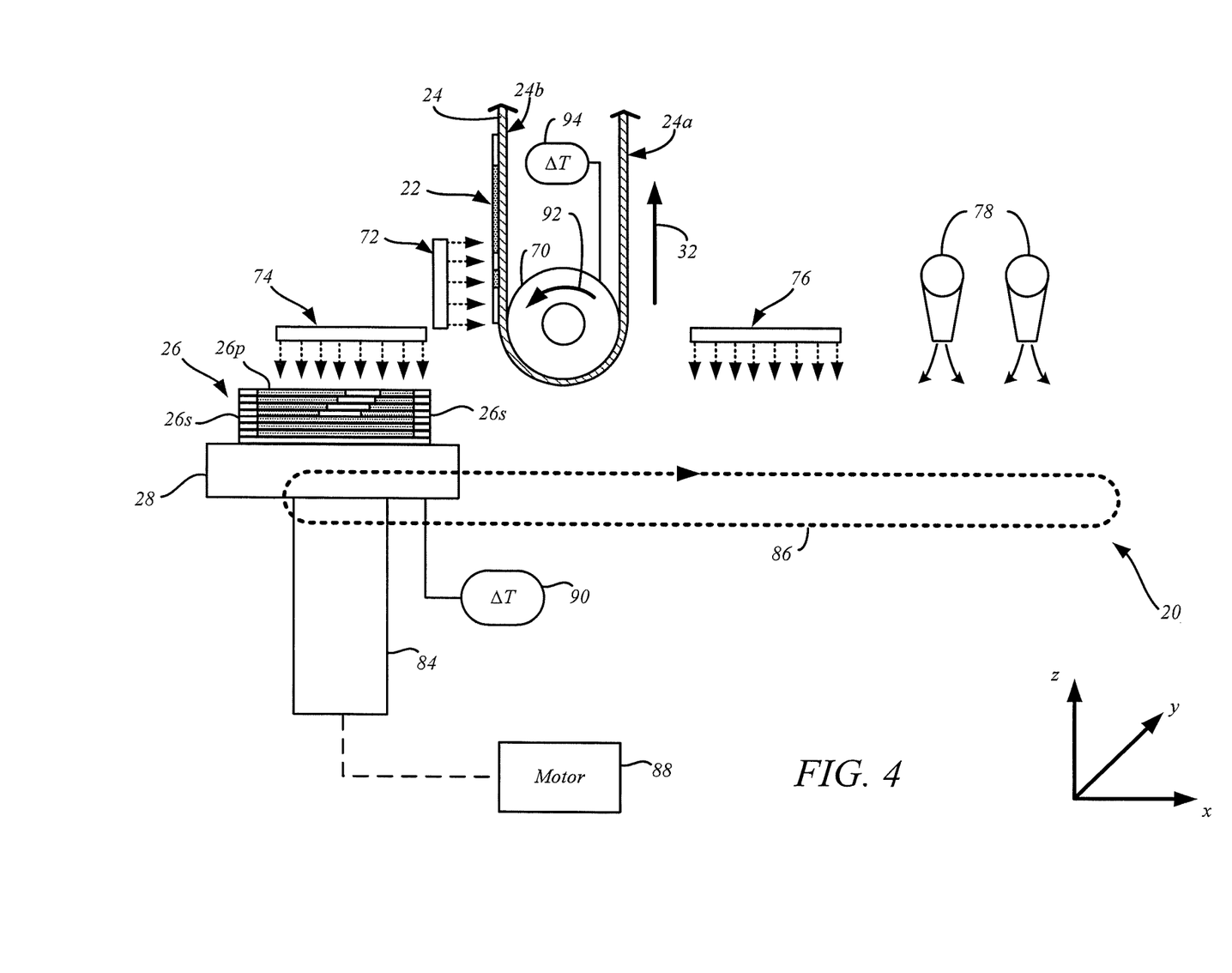
FIG. 4 is a schematic front view of an example transfusion assembly of the system for performing layer transfusion steps with the developed layers.

FIG. 4 illustrates an embodiment of the layer transfusion assembly 20. As shown, the transfusion assembly 20 includes the build platform 28, a nip roller 70, pre-transfusion heaters 72 and 74, an optional post-transfusion heater 76, and air jets 78 (or other cooling units). The build platform 28 is a platform assembly or platen of system 10 that is configured to receive the heated combined layers 22 (or separate layers 22p and 22s) for printing the part 26, which includes a 3D part 26p formed of the part layers 22p, and support structure 26s formed of the support layers 22s, in a layer-by-layer manner. In some embodiments, the build platform 28 may include removable film substrates (not shown) for receiving the printed layers 22, where the removable film substrates may be restrained against build platform using any suitable technique (e.g., vacuum drawing).

The build platform 28 is supported by a gantry 84 or other suitable mechanism, which can be configured to move the build platform 28 along the z-axis, the x-axis and the y-axis, as illustrated schematically in FIG. 1 (the y-axis being into and out of the page in FIG. 1, with the z-, x- and y-axes being mutually orthogonal, and with the positive y-axis following the right-hand rule). The gantry 84 may produce cyclical movement patterns relative to the nip roller 70 and other components, as illustrated by broken line 86 in FIG. 4. The particular movement pattern of the gantry 84 can follow essentially any desired path suitable for a given application. The gantry 84 may be operated by a motor 88 based on commands from the controller 36, where the motor 88 may be an electrical motor, a hydraulic system, a pneumatic system, or the like. In one embodiment, the gantry 84 can included an integrated mechanism that precisely controls movement of the build platform 28 in all of the z-, x- and y-axis directions. In alternate embodiments, the gantry 84 can include multiple, operatively-coupled mechanisms that each control movement of the build platform 28 in one or more directions, for instance, with a first mechanism that produces movement along both the z-axis and the x-axis and a second mechanism that produces movement along only the y-axis. The use of multiple mechanisms can allow the gantry 84 to have different movement resolution along different axes. Moreover, the use of multiple mechanisms can allow an additional mechanism to be added to an existing mechanism operable along fewer than three axes.

In the illustrated embodiment, the build platform 28 is heatable with heating element 90 (e.g., an electric heater). The heating element 90 is configured to heat and maintain the build platform 28 at an elevated temperature that is greater than room temperature (25° C.), such as at a desired average part temperature of 3D part 26p and/or support structure 26s, as discussed in Comb et al., U.S. Patent Application Publication Nos. 2013/0186549 and 2013/0186558. This allows the build platform 28 to assist in maintaining 3D part 26p and/or support structure 26s at this average part temperature.

The nip roller 70 is an example heatable element or heatable layer transfusion element, which is configured to rotate around a fixed axis with the movement of the belt 24. In particular, the nip roller 70 may roll against the rear surface 22s in the direction of arrow 92 while the belt 24 rotates in the feed direction 32. In the shown embodiment, the nip roller 70 is heatable with a heating element 94 (e.g., an electric heater). The heating element 94 is configured to heat and maintain nip roller 70 at an elevated temperature that is greater than room temperature (25° C.), such as at a desired transfer temperature for the layers 22.

The pre-transfusion heater 72 includes one or more heating devices (e.g., an infrared heater and/or a heated air jet) that are configured to heat the layers 22 on the belt 24 to a temperature near an intended transfer temperature of the layer 22, such as at least a fusion temperature of the part material 66p and the support material 66s, prior to reaching nip roller 70. Each layer 22 desirably passes by (or through) the heater 72 for a sufficient residence time to heat the layer 22 to the intended transfer temperature. The pre-transfusion heater 74 may function in the same manner as the heater 72, and heats the top surfaces of the 3D part 26p and support structure 26s on the build platform 28 to an elevated temperature, such as at the same transfer temperature as the heated layers 22 (or other suitable elevated temperature).

As mentioned above, the support material 66s of the present disclosure used to form the support layers 22s and the support structure 26s, preferably has a melt rheology that is similar to or substantially the same as the melt rheology of the part material 66p of the present disclosure used to form the part layers 22p and the 3D part 26p. This allows the part and support materials 66p and 66s of the layers 22p and 22s to be heated together with the heater 72 to substantially the same transfer temperature, and also allows the part and support materials 66p and 66s at the top surfaces of the 3D part 26p and support structure 26s to be heated together with heater 74 to substantially the same temperature. Thus, the part layers 22p and the support layers 22s may be transfused together to the top surfaces of the 3D part 26p and the support structure 26s in a single transfusion step as the combined layer 22.

Optional post-transfusion heater 76 is located downstream from nip roller 70 and upstream from air jets 78, and is configured to heat the transfused layers 22 to an elevated temperature. Again, the close melt rheologies of the part and support materials 66p and 66s allow the post-transfusion heater 76 to post-heat the top surfaces of 3D part 26p and support structure 26s together in a single post-fuse step.

As mentioned above, in some embodiments, prior to building the part 26 on the build platform 28, the build platform 28 and the nip roller 70 may be heated to their desired temperatures. For example, the build platform 28 may be heated to the average part temperature of 3D part 26*p* and support structure 26*s*. Additionally, the nip roller 70 may be heated to a desired transfer temperature for the layers 22.

During the printing or transferring operation, the belt 24 carries a layer 22 past the heater 72, which may heat the layer 22 and the associated region of the belt 24 to the transfer temperature. Suitable transfer temperatures for the part and support materials 66*p* and 66*s* of the present disclosure include temperatures that exceed the glass transition temperature of the part and support materials 66*p* and 66*s*, where the layer 22 is softened but not melted.

As further shown in FIG. 4, during operation, the gantry 84 may move the build platform 28 (with 3D part 26*p* and support structure 26*s*) in a reciprocating pattern 86. In particular, the gantry 84 may move the build platform 28 along the x-axis below, along, or through the heater 74. The heater 74 heats the top surfaces of 3D part 26*p* and support structure 26*s* to an elevated temperature, such as the transfer temperatures of the part and support materials. As discussed in Comb et al., U.S. Patent Application Publication Nos. 2013/0186549 and 2013/0186558, the heaters 72 and 74 may heat the layers 22 and the top surfaces of 3D part 26*p* and support structure 26*s* to about the same temperatures to provide a consistent transfusion interface temperature. Alternatively, the heaters 72 and 74 may heat layers 22 and the top surfaces of 3D part 26*p* and support structure 26*s* to different temperatures to attain a desired transfusion interface temperature.

The continued rotation of the belt 24 and the movement of the build platform 28 align the heated layer 22 with the heated top surfaces of 3D part 26*p* and support structure 26*s* with proper registration along the x-axis. The gantry 84 may continue to move the build platform 28 along the x-axis, at a rate that is synchronized with the rotational rate of the belt 24 in the feed direction 32 (i.e., the same directions and speed). This causes the rear surface 24*b* of the belt 24 to rotate around the nip roller 70 to nip the belt 24 and the heated layer 22 against the top surfaces of 3D part 26*p* and support structure 26*s*. This presses the heated layer 22 between the heated top surfaces of 3D part 26*p* and support structure 26*s* at the location of the nip roller 70, which at least partially transfuses the heated layer 22 to the top layers of 3D part 26*p* and support structure 26*s*.

As the transfused layer 22 passes the nip of the nip roller 70, the belt 24 wraps around the nip roller 70 to separate and disengage from the build platform 28. This assists in releasing the transfused layer 22 from the belt 24, allowing the transfused layer 22 to remain adhered to 3D part 26*p* and support structure 26*s*. Maintaining the transfusion interface temperature at a transfer temperature that is higher than its glass transition temperature, but lower than its fusion temperature, allows the heated layer 22 to be hot enough to adhere to the 3D part 26*p* and support structure 26*s*, while also being cool enough to readily release from the belt 24. Additionally, as discussed above, the close melt rheologies of the part and support materials allow them to be transfused in the same step.

After release, the gantry 84 continues to move the build platform 28 along the x-axis to the post-transfusion heater 76. At post-transfusion heater 76, the top-most layers of 3D part 26*p* and the support structure 26*s* (including the transfused layer 22) may then be heated to at least the fusion temperature of the thermoplastic-based powder in a post-fuse or heat-setting step. This melts the material of the transfused layer 22 to a highly fusable state such that polymer molecules of the transfused layer 22 quickly inter-diffuse to achieve a high level of interfacial entanglement with 3D part 26*p* and support structure 26*s*.

Additionally, as the gantry 84 continues to move the build platform 28 along the x-axis past the post-transfusion heater 76 to the air jets 78, the air jets 78 blow cooling air towards the top layers of 3D part 26*p* and support structure 26*s*. This actively cools the transfused layer 22 down to the average part temperature, as discussed in Comb et al., U.S. Patent Application Publication Nos. 2013/0186549 and 2013/0186558.

To assist in keeping the 3D part 26*p* and support structure 26*s* at the average part temperature, in some preferred embodiments, the heater 74 and/or the heater 76 may operate to heat only the top-most layers of 3D part 26*p* and support structure 26*s*. For example, in embodiments in which heaters 72, 74, and 76 are configured to emit infrared radiation, the 3D part 26*p* and support structure 26*s* may include heat absorbers and/or other colorants configured to restrict penetration of the infrared wavelengths to within the top-most layers. Alternatively, the heaters 72, 74, and 76 may be configured to blow heated air across the top surfaces of 3D part 26*p* and support structure 26*s*. In either case, limiting the thermal penetration into 3D part 26*p* and support structure 26*s* allows the top-most layers to be sufficiently transfused, while also reducing the amount of cooling required to keep 3D part 26*p* and support structure 26*s* at the average part temperature.

The gantry 84 may then actuate the build platform 28 downward, and move the build platform 28 back along the x-axis to a starting position along the x-axis, following the reciprocating rectangular pattern 86. The build platform 28 desirably reaches the starting position for proper registration with the next layer 22. In some embodiments, the gantry 84 may also actuate the build platform 28 and 3D part 26*p*/support structure 26*s* upward for proper registration with the next layer 22. The same process may then be repeated for each remaining layer 22 of 3D part 26*p* and support structure 26*s*.

After the transfusion operation is completed, the resulting 3D part 26*p* and support structure 26*s* may be removed from system 10 and undergo one or more post-printing operations. For example, support structure 26*s* may be sacrificially removed from 3D part 26*p* using an aqueous-based solution, such as an aqueous alkali solution. Under this technique, support structure 26*s* may at least partially dissolve in the solution, separating it from 3D part 26*p* in a hands-free manner.

In comparison, part materials are chemically resistant to aqueous alkali solutions. This allows the use of an aqueous alkali solution to be employed for removing the sacrificial support structure 26*s* without degrading the shape or quality of 3D part 26*p*. Examples of suitable systems and techniques for removing support structure 26*s* in this manner include those disclosed in Swanson et al., U.S. Pat. No. 8,459,280; Hopkins et al., U.S. Pat. No. 8,246,888; and Dunn et al., U.S. Patent Application Publication No. 2011/0186081; each of which are incorporated by reference to the extent that they do not conflict with the present disclosure.

Furthermore, after support structure 26*s* is removed, 3D part 26*p* may undergo one or more additional post-printing processes, such as surface treatment processes. Examples of suitable surface treatment processes include those disclosed in Priedeman et al., U.S. Pat. No. 8,123,999; and in Zinniel, U.S. Pat. No. 8,765,045.

Figures 5A, 5B:
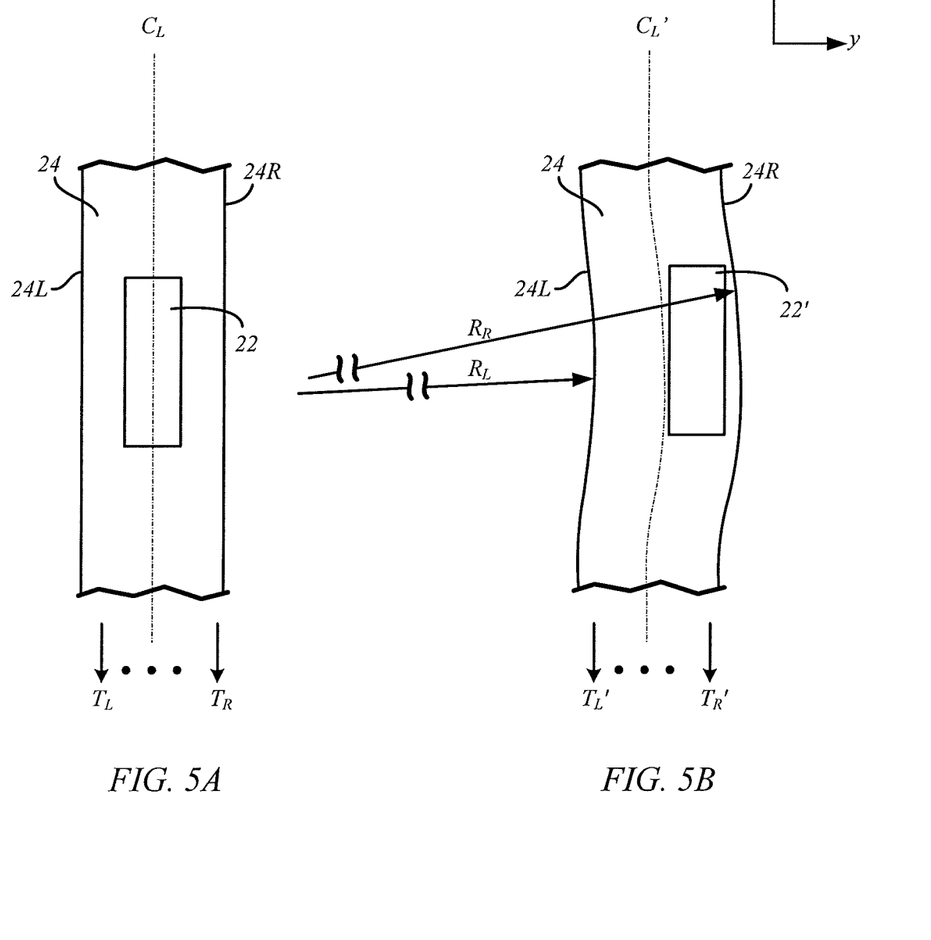
FIG. 5A is a schematic plan view of an example transfer medium and developed layer.
FIG. 5B is a schematic plan view of another example transfer medium and developed layer, subject to conical deformation.
Figure 6A:
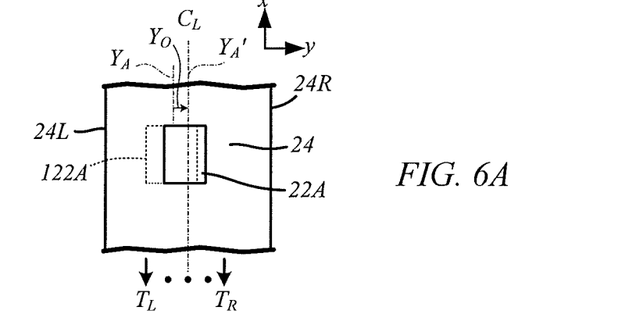
FIGS. 6A to 6D are schematic plan views of an example transfer medium and symmetrically aligned developed layers that have been repositioned relative to asymmetric nominal images shown in phantom.
Figure 6B:
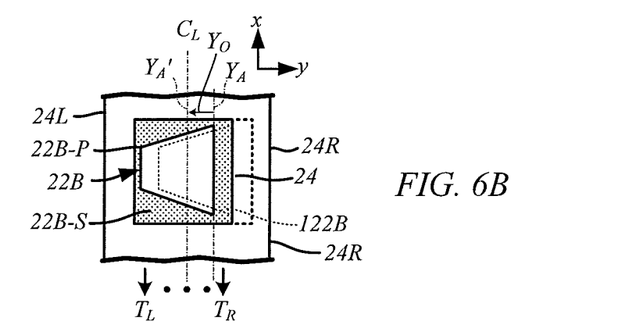
Figure 6C:
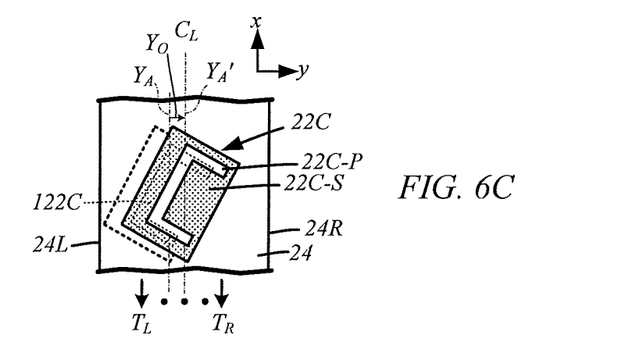
Figure 6D:
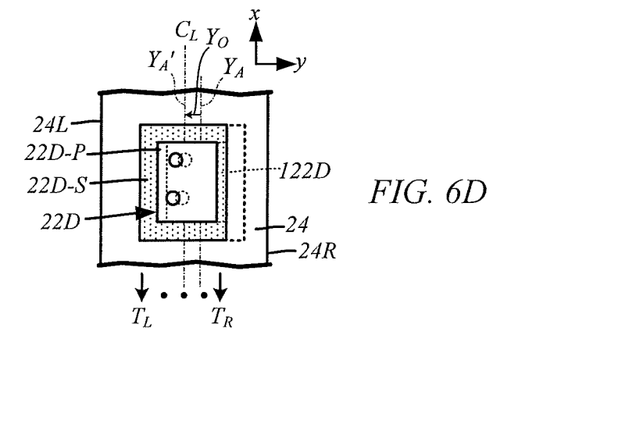

FIG. 5A is a schematic plan view of an example developed layer 22 and transfer medium belt 24, which has opposite edges 24L and 24R and a cross-track centerline $C_L$ that represents a meanline between the edges 24L and 24R. Although only a portion of the belt 24 is shown in FIG. 5A, the belt 24 has a non-skewed, non-canted loop shape as it follows a path guided by cylindrical support rollers (not shown). The belt 24 is subjected to in-track tensile forces $T_L$ to $T_R$ that are distributed across the belt 24 in a cross-track (y-axis for a portion of the belt 24 in a plane) direction between the edges 24L and 24R, respectively. The cylindrical support rollers promote a uniform (i.e., substantially equal) distribution of in-track tensile forces $T_L$ to $T_R$. The developed layer 22, in the illustrated embodiment, has a symmetrical shape, with a rectangular perimeter, and an axis of symmetry of the developed layer is aligned with the cross-track centerline $C_L$ of the belt 24.

Transfer medium belt 24 is normally supported by rollers and the like with a non-skewed, non-canted loop shape, such as a cylindrical shape in a simple embodiment, and will track accurately on parallel cylindrical rollers. If, instead, transfer medium belt 24 is frusto-conical, and/or if one edge 24L or 24R is longer than the other, then transfer medium belt 24 will attempt to track on a conical surface and have a canted or skewed loop shape. Temperature, pressure, friction and tensile forces, alone or in combination, can potentially contribute to undesirable skew and/or canting of belt 24 during operation.

The powder-based material (e.g., polymeric or thermoplastic toner) used in many electrophotographic 3D part printing processes is typically derived from one or more engineering-grade thermoplastic materials, such as, for example, Acrylonitrile-Butadiene-Styrene (ABS). The transfer medium belt 24 in some embodiments is a belt made of polymeric and/or metallic materials, and may be a polymeric material doped with one or more electrically conductive materials. Examples of suitable polymeric materials include polyimide materials, such as those commercially available under the trade designation "KAPTON" from E.I. du Pont de Nemours and Company, Wilmington, Del. The thermal expansion coefficient of Kapton is about 20 ppm/° C. (or about 0.002%/° C.). The region of transfer medium belt 24 in contact with pre-heated, developed layer 22 may rise from a nominal 30° C. to 180° C. for ABS, expanding the belt core material by (180° C.–30° C.)*(20 ppm/° C.)=0.3%. As an illustrative example, over a 24-inch developed layer 22 (in an in-track direction following feed direction 32 along the x-axis), this equates to stretching the transfer medium belt's in-track length under developed layer 22 by 72 mils. As shown in FIG. 5A, the symmetrical shape and central location of developed layer 22 relative to cross-track centerline $C_L$ of belt 24 produce uniform and symmetrical heating and expansion of belt 24, which means that the distribution of in-track tensile forces $T_L$ to $T_R$ remain symmetrical relative to belt 24 and belt 24 can maintain the intended non-skewed, non-canted loop shape established by the cylindrical support rollers, and can track accurately on those cylindrical support rollers.

However, developed layers 22 typically do not occupy an entire processing region of transfer medium belt 24, and can have complex and irregular perimeter shapes in which developed layer 22 contacts some areas of belt 24 but not others. Moreover, a desired configuration of the 3D part being built may require developed layers 22 to be arranged in irregular and asymmetric positions on belt 24 relative to cross-track centerline $C_L$. Again, the region of transfer medium belt 24 in contact with pre-heated, developed layer 22 may rise from a nominal 30° C. to 180° C. for ABS, expanding the belt core material by 0.3%. But because regions of transfer medium belt 24 not contacting the developed layer might heat to only 105° C. in the same processing region, the belt lengthens (in the in-track direction) by only 0.15% (or 36 mils for a 24-inch length of belt 24) in those regions, which is half of the expansion of regions in contact with developed layer 22. These different degrees of expansion within different portions or regions of transfer medium belt 24 contribute to varying in-track tensile forces $T_L$ to $T_R$ in transfer medium belt 24 and/or canted/skewed geometric deformations of transfer medium belt 24. These thermal-induced problems arise as a given developed layer 22 is being conveyed from EP engine 12 to transfusion assembly 20, and may be exacerbated as heat is applied to developed layer 22 and the transfer medium as developed layer 22 moves from EP engine 12 to transfusion assembly 20. Once these thermal-induced problems arise, they can lead to undesirable layer-to-layer misalignment during transfusion, and otherwise diminish the controllability of transfusion processes. Moreover, because there are usually layer-to-layer shape variations in developed layers 22, the amount of deflection and/or tension differentials can vary for each layer of the 3D part.

Similarly, when layer transfusion is performed at nip roller 70, asymmetric tension can be produced in transfer medium belt 24 (i.e., unequal in-track tensile forces $T_L$ to $T_R$) as a function of unequal pressure and friction on belt 24. The unequal in-track tensile forces are caused, in part, by asymmetric positioning of developed layer 22 on belt 24. Large developed layers 22 require adjustments of the x-axis (or in-track) position of the new layer 22 with respect to the part build surface within that layer 22 to compensate for overlay errors (due to temperature variations, roller runout, tension changes, vibration, and other effects). While belt 24 dynamically slides (Poiseuille-skids) developed layer 22 on the build surface of the 3D part (e.g., on a build surface of a previously transfused layer) during transfusion, allowing adjustments mid-transfusion, this means that tension on belt 24 must change as the skidding force changes. But if the tension changes are not symmetric across belt 24, in-track tensile forces $T_L$ to $T_R$ will tend to be unequal causing one edge 24L or 24R of belt 24 to asymmetrically stretch with respect to the other, and the y-axis (or cross-track) tracking of belt 24 will be adversely affected just as with temperature-induced tension variations. Such asymmetric tension variations in belt 24 at nip roller 70 are exacerbated by asymmetric positioning of developed layer 22 on belt 24 relative to cross-track centerline $C_L$. Just as with thermal-induced problems, these tensile-induced problems can lead to layer misalignment and decreased transfusion controllability, and the amount of deflection and/or tension differentials can also vary for each layer of the 3D part.

FIG. 5B is a schematic plan view of example developed layer 22' and transfer medium belt 24, subject to conical deformation. As shown in FIG. 5B, developed layer 22' has a symmetrical, rectangular perimeter shape like that of layer 22 shown in FIG. 5A; however, developed layer 22' is positioned asymmetrically on belt 24 in the cross-track (y-axis) direction, being located closer to edge 24R than edge 24L. The positioning of developed layer 22' has caused thermal-induced tension variations (represented schematically by arrows for in-track tensile forces $T_L'$ to $T_R'$), as well as conical deformation of belt 24. The conical deformation of belt 24 is related to curvature of edges 24R and 24L in the x-y plane (i.e., in a plane containing both the in-track and cross-track axes), which is indicated by arrows $R_R$ and $R_L$ representing the respective radii of curvature in the x-y plane.

If transfer medium belt 24 in FIG. 5B is 15 inches wide along the y-axis (i.e., cross-track direction) and edge 24R is 0.15% longer than edge 24L, this produces an effective radius of curvature $R_R$ of edge 24R in the x-y plane in which $R_R$=15 inches/(0.0015)=10,000 inches. For a 24-inch in-track length of transfer medium belt 24 (i.e., along the x-axis), the cross-track (y-axis) deflection of belt 24 becomes $((24\ \text{in})^2)/(8*R)$, or 7.2 mils, or about five 600 dpi voxels.

In order to reduce, limit or prevent the skewing or canting of loop-shaped transfer medium belt 24, including the temperature- and tension-induced problems discussed above in reference to FIGS. 5A and 5B, the present disclosure describes a method and associated system for orienting developed layer 22 on belt 24 using a cross-track offset distance $y_O$ measured between average cross-track symmetry line $y_A$ associated with a given developed layer 22 and cross-track centerline $C_L$ of transfer medium belt 24. The average cross-track symmetry line $y_A$ can be based upon the area of the layer, the perimeter of the layer or combinations thereof. A goal is to orient developed layer 22 on transfer medium belt 24 such that, on average, the developed layer 22 is symmetric about cross-track centerline $C_L$.

FIGS. 6A to 6D are schematic plan views of examples of transfer medium belt 24 supporting symmetrically aligned developed layers 22A to 22D that have been repositioned relative to asymmetric nominal layer images 122A to 122D, which are shown in phantom. Each of the developed layers 22A to 22D (and corresponding nominal layer images 122A to 122D) has a different shape, including a different perimeter shape, many of which are irregular. Average cross-track symmetry lines $y_A$ are illustrated for each nominal layer image 122A to 122D, along with cross-track offset distances $y_O$ measured between average cross-track symmetry line $y_A$ of a given nominal layer image 122A to 122D and cross-track centerline $C_L$ of transfer medium belt 24. Average cross-track symmetry lines $y_{A'}$ are also illustrated for each developed layer 22A to 22D. The symmetry lines $y_A$ and $y_{A'}$ relate to the respective images 122A to 122D and developed layers 22A to 22D identically. Average cross-track symmetry lines $y_{A'}$ are merely translated in the cross-track (y-axis) direction by the corresponding cross-track offset distances $y_O$. Cross-track offset distances $y_O$ can have positive or negative values (relative to cross-track symmetry line $y_A$). As shown in FIGS. 6A to 6D, nominal layer images 122A to 122D represent the nominal positions of corresponding developed layers 22A to 22D if there was no offset or repositioning as part of the presently-disclosed method and system, that is, as if developed layers 22A to 22D were supported on transfer medium belt 24 in a fixed cross-track (y-axis) location relative to EP engine 12, build platform 28, a build surface of previously transfused layers of the 3D part, and the original digital representation of the 3D part to be built (or a slice thereof).

The developed layer 22A is illustrated as made of a single material (e.g., all part/build material or all support material). In contrast, the developed layers 22B, 22C and 22C shown in FIGS. 6B-6D includes a first region 22B-p, 22C-p and 22D-p made of part material and a second region 22B-s, 22C-s and 22D-s made of support material (shown with stippling). The developed layer 22B, 22C and 22D can be made by developing first region 22B-p, 22C-p and 22D-p with EP engine 12p and second region 22B-s, 22C-s and 22D-s with EP engine 12s, for example. Because properties of the part material and the support material are typically similar in terms of density and the like, the first and second regions 22B-p, 22C-p and 22D-p and 22B-s, 22C-s and 22D-s need not be treated separately when determining cross-track offset distance $y_O$ and/or average cross-track symmetry line $y_A$. However, in embodiments where the part material and the support material are dissimilar in terms or density or any other characteristics, then the different regions can, for instance, be weighted different or otherwise treated differently when determining cross-track offset distance $y_O$ and/or average cross-track symmetry line $y_A$.

When the developed layers 22A to 22D are offset in the cross-track (y-axis) direction by cross-track offset distances $y_O$, the corresponding average cross-track symmetry lines $y_{A'}$ are each aligned with cross-track centerline $C_L$ of transfer medium belt 24. During operation of system 10, average cross-track symmetry lines $y_{A'}$ can remain aligned with cross-track centerline $C_L$ as long as the associated developed layer 22A to 22D is supported by transfer medium belt 24, such as during the entire time a given developed layer 22A to 22D is being conveyed from one or more EP engines 12 to transfusion assembly 20. Developed layers 22A to 22D and transfer medium belt 24 can be heated by heater 72, for instance, while being conveyed through system 10, while reducing a risk that either the thermal energy in developed layers 22A to 22D from EP development or from heater 72 will deform transfer medium belt 24 or induce asymmetric tensions in belt 24. In this respect, in-track tensile forces $T_L$ to $T_R$ in transfer medium belt 24 can be substantially symmetrical about cross-track centerline $C_L$, and can remain symmetrical whenever developed layers 22A to 22D are supported by belt 24 (including during transfusion). Use of average cross-track symmetry lines $y_{A'}$ accommodates irregular shapes of each developed layer 22A to 22D, for instance, averaging the respective x-y plan area of each developed layer 22A to 22D in the in-track (x-axis) direction to arrive at a single symmetry line for the entire layer.

It should be noted that the embodiments illustrated in FIGS. 6A to 6D are shown by way of example and not limitation. In further embodiments, an essentially endless number of layer configurations are possible, including layers with non-contiguous regions of material, more than two different types of material, and the like. Moreover, because each layer of the 3D part will tend to have unique shape and/or positioning characteristics, the locations of average cross-track symmetry lines $y_{A'}$ and values of cross-track offset distances $y_O$ can vary layer-to-layer.

Operation of system 10 can involve the following steps, although it should be noted that in alternate embodiments additional steps not specifically mentioned can also be performed, and certain steps described can also be omitted or modified.

First, a slice of a digital representation of the 3D part to be built is analyzed and processed (e.g., using computer 38 and/or controller 36), in order to assess characteristics of at least one layer of the 3D part. As part of this analysis, cross-track offset distances $y_O$ and average cross-track symmetry lines $y_A$ and/or $y_{A'}$ are determined for a given slice and layer 22. These determinations can be made concurrently, or, alternatively, in discrete steps.

In one embodiment, the developed layer 22 is analyzed as a binary bitmap B(x,y), representing an area of developed layer 22 in the x-y plane, and cross-track offset distance $y_O$ is calculated such that equation (1) is satisfied:

$$\int dx \int dy\, B(x,y)(y - y_O) = 0 \qquad \text{Equation (1)}$$

where y is measured from cross-track centerline $C_L$. In this approach, cross-track symmetry line $y_A$ is, by default, a line parallel to cross-track centerline $C_L$ and spaced from cross-track centerline $C_L$ by cross-track offset distance $y_0$. Such an approach allows cross-track offset distances $y_0$ and average cross-track symmetry lines $y_A$ and $y_A'$ to be determined based exclusively on an area of developed layer 22 in the x-y plane.

In alternative embodiments, other methods of determining cross-track offset distances $y_0$ and average cross-track symmetry lines $y_A$ and $y_A'$ can be used, alone or in conjunction with other calculations, such as geographic midpoint and center of gravity methodologies, a center of minimum distance methodology, and, for layers with simple shapes, taking cross-track midpoints at a suitable number of in-track locations and averaging those mid-points across the entire in-track length of the layer.

After cross-track offset distances $y_0$ and average cross-track symmetry lines $y_A$ and $y_A'$ have been determined, layer 22 is developed and transferred to transfer medium 24 (e.g., a belt) such that cross-track symmetry line $y_A'$ is aligned with cross-track centerline $C_L$. Layer 22 can be developed using at least one EP engine 12, such as both EP engine 12s and EP engine 12s, and can include part material and/or support material. Because photoconductor drum 42 and transfer medium 24 are generally substantially fixed relative to one another in the cross-track (y-axis) direction, despite rotation of photoconductor drum 42 and movement of transfer medium 24 in the in-track direction, the latent-charged image used to develop layer 22 can be created on photoconductive surface 46 of photoconductor drum 42 offset from a nominal location in order to align cross-track symmetry line $y_A'$ with cross-track centerline $C_L$ when developed layer 22 is transferred to transfer medium 24.

Figure 7:
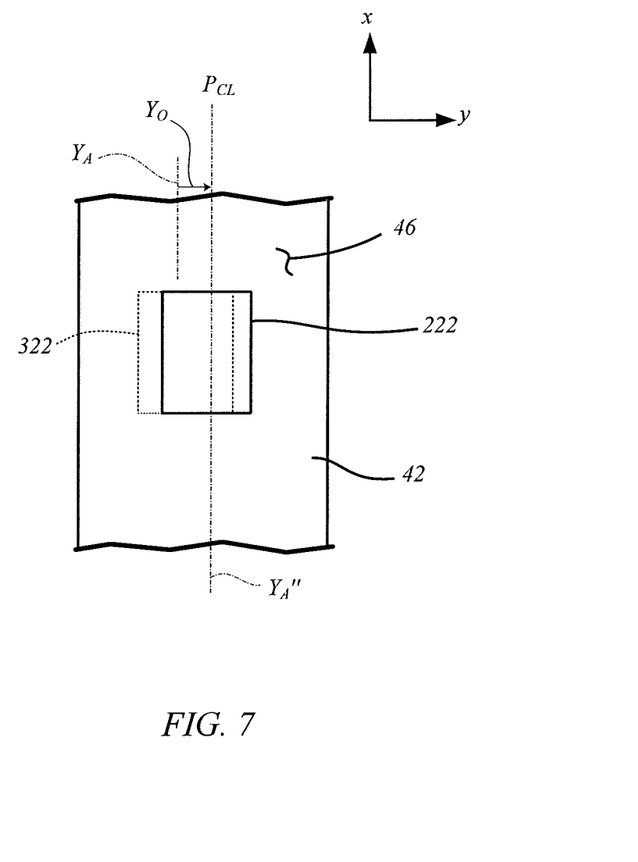
FIG. 7 is a schematic elevation view of an example photoconductor drum of an electrophotography engine and a latent-charged electrostatic image that has been repositioned relative to an asymmetric nominal image shown in phantom.

FIG. 7 is a schematic elevation view of example photoconductor drum 42 and latent-charged electrostatic image 222 that has been repositioned by cross-track offset distance $y_0$ through translation in the cross-track (y-axis) direction relative to nominal image 322 shown in phantom. Projected line $P_{CL}$ of cross-track centerline $C_L$ is projected onto photoconductor drum 42 in FIG. 7 for reference purposes. By offsetting latent-charged electrostatic image 222 by cross-track offset distance $y_0$, cross-track symmetry line $y_A''$ is aligned with projected line $P_{CL}$, which allows developed layer 22 to be transferred to transfer medium 24 with cross-track symmetry line $y_A'$ aligned with cross-track centerline $C_L$, without any need to reposition photoconductor drum 42 relative to transfer medium 24. There multiple EP engines 12 are used, each region or portion of the overall developed layer 22 can be images, developed and transferred in this same manner, such as to provide both part and support materials of developed layer 22 on transfer medium 24 in an overall symmetric manner on average.

Once developed layer 22 is transferred to transfer medium 24 in a symmetric position, developed layer 22 is conveyed in the in-track direction from the one or more EP engines 12 to transfusion assembly 20. While being conveyed, developed layer 22 can be subjected to heating by heater 72, for example. Average cross-track symmetry line $y_A'$ can remain aligned with cross-track centerline $C_L$ as long as developed layer 22 is supported by transfer medium belt 24, such as during the entire time developed layer 22 is being conveyed from one or more EP engines 12 to transfusion assembly 20 (as well as during transfusion). In this way, the disclosed positioning of developed layer 22 on transfer medium 24 helps to maintain symmetric in-track tensile forces $T_L$ to $T_R$ in transfer medium 24 in the cross-track direction while developed layer 22 is being conveyed, and can help avoid skewing, canting and conical deformations of transfer medium 24.

Developed layer 22 is then transfused using transfusion assembly 20, to build the 3D part in a layer-by-layer manner. In order to compensate for cross-track offset distance $y_0$, build platform 28 (and any previously-transfused layers of the in-process 3D part carried by build platform 28) are moved relative to transfer medium 24, such as cross-track offset distance $y_0$ or by any other distance to move build platform 28 from a prior location to a suitable location to overlay developed layer 22 on a part build surface. This translational movement of build platform 28 can be performed in relation to a cross-track centerline of build platform 28 that extends in the in-track direction, and the build platform centerline can be offset from the centerline of transfer medium 24 (e.g., by cross-track offset distance $y_0$) while transfusing developed layer 22 at the build surface. Such movement can be accomplished using gantry 84 to translate build platform 28 in the cross-track (y-axis) direction, in addition to cyclic movements of build platform 28 used as part of a typical transfusion process, or by any other suitable mechanism that produces relative movement between developed layer 22 and build platform 28. Following such translating movement, developed layer 22 is transfused. During transfusion, in-track tension of transfer medium 24 can be adjusted, such as to compensate for transfer medium 24 sliding (Poiseuille-skidding). Average cross-track symmetry line $y_A'$ can remain aligned with cross-track centerline $C_L$ during transfusion, including while developed layer passes nip roller 70. Positioning of developed layer 22 on transfer medium 24 as disclosed helps to maintain symmetric in-track tensile forces $T_L$ to $T_R$ in transfer medium 24 in the cross-track direction while developed layer 22 is being transfused, and can help avoid skewing, canting and conical deformations of transfer medium 24 during transfusion. Moreover, in-track tensile forces $T_L$ to $T_R$ at opposite edges 24L and 24R of transfer medium 24 can be kept substantially equal during transfusion. In this way, non-conical tracking of transfer medium 24 can be maintained during transfusion to promote more accurate layer overlay and more controllable transfusion processes in general.

Gantry 84 can "reset" and move build platform back to a default position after a given developed layer 22 is transfused.

The steps described above can be repeated to build additional layers of the 3D part. As already noted, cross-track offset distance $y_0$ and average symmetry lines will typically be different layer-to-layer. Moreover, the steps described above can be implemented in computer-readable instructions implemented by system 10, using processors of computer 38 and/or controller 36.

In some instances, a cross-sectional area of a part changes substantially as a part and its associated support structure are printed. Typically, cross-sectional area of a part and associated support structure remains substantially constant to print layer upon layer into a rectangular prism shape. To retain a rectangular prism shape, as the cross-sectional area of the part is reduced, the cross-sectional area of the support structure is increased. In many instances, the increased area of the support structure in some areas of the part layers is not necessary.

In another embodiment of the present disclosure, the Y position of the stage is adjusted to accommodate different layers of the part being printed, such that the Y location of the imaged layer on the belt aligns with the Y location of the part build surface. Adjusting the Y location of the stage allows less support material to be utilized in some regions of the part, which saves on costs and support removal time.

Otherwise stated, the centerline of the part being printed is adjusted based upon the configuration of the part being printed. The Y location of the print stage is adjusted to accommodate for the change in the centerline of the part at different heights (or Z locations).

Persons of ordinary skill in the art will recognize that the method and system disclosed herein provides numerous advantages and benefits, such as improved transfusion overall accuracy and improved control over transfusion processes. Moreover, stresses in transfer media can be reduced.

Although the present disclosure has been described with reference to preferred embodiments, workers skilled in the art will recognize that changes may be made in form and detail without departing from the spirit and scope of the disclosure.

The invention claimed is:

1. A method of producing a 3D part using a selective deposition based additive manufacturing system, the method comprising:
    developing a first layer using at least one electrophotographic engine, wherein the first layer comprises at least one of a part material and a support material;
    determining a first cross-track offset distance between an average cross-track symmetry line of the first layer and a centerline of a transfer medium, wherein the first cross-track offset distance is measured in a cross-track direction substantially perpendicular to an in-track direction of movement of the transfer medium;
    transferring the first layer to the transfer medium such that the average cross-track symmetry line of the first layer is substantially aligned with the centerline of the transfer medium;
    moving a build platform relative to the transfer medium in the cross-track direction to align the first layer on a part build surface; and
    transfusing the first layer on the build platform using a transfusion assembly to build the 3D part in a layer-by-layer manner.

2. The method of claim 1, wherein the step of developing the first layer using at least one electrophotographic engine comprises developing a first region of the first layer using the 3D part material developed by a first electrophotographic engine and developing a second region of the first layer using the support material developed by a second electrophotographic engine.

3. The method of claim 1, wherein the location of the average cross-track symmetry line for the first layer is based on an area of the first layer in a plane defined by axes for the cross-track direction and the in-track direction.

4. The method of claim 1, wherein the step of developing the first layer using at least one electrophotographic engine further comprises:
    electrostatically imaging a first photoconductor drum to create a first latent-charged image of at least a portion of the first layer; and
    transferring the 3D part material in a charged state to the first photoconductor drum in the shape of the first latent-charged image,
    wherein the first photoconductor drum and the transfer medium are held in substantially fixed positions relative to each other in the cross-track direction while developing the first layer.

5. The method of claim 4, wherein the first latent-charged image has a cross-track symmetry line that corresponds to the average cross-track symmetry line of the first layer, and wherein the cross-track symmetry line of the first latent-charged image is aligned with a projection of the centerline of the transfer medium onto the first photoconductor drum.

6. The method of claim 5 further comprising:
    developing a second layer using the at least one electrophotographic engine, wherein the second layer comprises at least one of a part material and a support material.

7. The method of claim 6, wherein the second layer has a cross-track symmetry line that corresponds to the average cross-track symmetry line of the first layer.

8. The method of claim 1, wherein the location of the average cross-track symmetry line for the first layer is based on an area of the first layer in a plane defined by axes for the cross-track direction and the in-track direction, and is averaged along an overall in-track dimension of the first layer.

9. The method of claim 1 further comprising:
    adjusting in-track tension of the transfer medium while transfusing the first layer on the build platform.

10. The method of claim 1, wherein the average cross-track symmetry line is based upon an area of the layer, a perimeter of the layer or combinations thereof.

11. The method of claim 1, wherein a build platform centerline that extends in the in-track direction is offset from the centerline of the transfer medium by the first cross-track offset distance while transfusing the first layer.

12. The method of claim 1 further comprising:
    developing a second layer using the at least one electrophotography engine, wherein the second layer comprises at least one of the part material and the support material;
    determining a second cross-track offset distance between an average cross-track symmetry line of the second layer and the centerline of the transfer medium, wherein the second cross-track offset distance is measured in the cross-track direction substantially perpendicular to the in-track direction, and wherein the second cross-track offset distance is different than the first cross-track offset distance;
    transferring the second layer to the transfer medium such that the average cross-track symmetry line of the second layer is substantially aligned with the centerline of the transfer medium;
    moving the build platform relative to the transfer medium by the second cross-track offset distance; and
    transfusing the second layer on the build platform using the transfusion assembly to further build the 3D part in a layer-by-layer manner, wherein a build platform centerline that extends in the in-track direction is offset from the centerline of the transfer medium by the second cross-track offset distance while transfusing the second layer.

13. The method of claim 1 further comprising:
    conveying the first layer from the at least one electrophotographic engine to the transfusion assembly by moving the transfer medium in the in-track direction, wherein the average cross-track symmetry line of the first layer remains substantially aligned with the centerline of the transfer medium as long as the first layer is supported by the transfer medium.

14. The method of claim 1 further comprising:
    conveying the first layer from the at least one electrophotographic engine to the transfusion assembly by moving the transfer medium in the in-track direction; and
    applying heat to the first layer while being conveyed from the at least one electrophotographic engine to the transfusion assembly, wherein the first layer has a coefficient of thermal expansion different from a coefficient of thermal expansion of a core material of the transfer medium.

15. The method of claim 1, wherein the transfer medium maintains a non-conical tracking position while the first layer is transfused.

16. The method of claim 1 further comprising:
adjusting a centerline of the 3D part being printed based upon a geometry of the 3D part in the Z-axis direction; and
adjusting a location of the build platform in a Y-axis direction based upon the change in the centerline of the 3D part being printed.

17. A method of producing a 3D part using a selective deposition additive manufacturing system, the method comprising:
determining a location of an average cross-track symmetry line of a first layer based on an area of the first layer in a plane defined by axes for a cross-track direction and an in-track direction perpendicular to the cross-track direction, and averaged along an overall in-track dimension of the first layer;
determining a first cross-track offset distance between the average cross-track symmetry line of the first layer and a centerline of a transfer medium, wherein the first cross-track offset distance is measured in the cross-track direction, and wherein the transfer medium is flexible;
developing the first layer using at least one electrophotographic engine, wherein the first layer comprises at least one of a part material and a support material;
transferring the first layer to the transfer medium such that the average cross-track symmetry line for the first layer is substantially aligned with the centerline of the transfer medium, wherein the first layer is at a higher temperature than the transfer medium when the first layer is transferred to the transfer medium;
conveying the first layer from the at least one electrophotographic engine to a transfusion assembly by moving the transfer medium in the in-track direction, wherein the average cross-track symmetry line of the first layer remains substantially aligned with the centerline of the transfer medium while being conveyed;
moving a build platform relative to the transfer medium by the first cross-track offset distance; and
transfusing the first layer on the build platform using the transfusion assembly to build the 3D part in a layer-by-layer manner, wherein a build platform centerline that extends in the in-track direction is offset from the centerline of the transfer medium while transfusing the first layer.

18. The method of claim 17 further comprising:
determining a location of an average cross-track symmetry line of a second layer;
determining a second cross-track offset distance between the average cross-track symmetry line of the second layer and the centerline of the transfer medium, wherein the second cross-track offset distance is measured in the cross-track direction substantially perpendicular to the in-track direction, and wherein the second cross-track offset distance is different than the first cross-track offset distance;
developing the second layer using the at least one electrophotographic engine, wherein the second layer comprises at least one of the part material and the support material;
transferring the second layer to the transfer medium such that the average cross-track symmetry line of the second layer is substantially aligned with the centerline of the transfer medium;
conveying the second layer from the at least one electrophotographic engine to the transfusion assembly by moving the transfer medium in the in-track direction, wherein the average cross-track symmetry line of the second layer remains substantially aligned with the centerline of the transfer medium while being conveyed;
moving the build platform relative to the transfer medium substantially in the cross-track direction to overlay the first layer on a part build surface; and
transfusing the second layer on the build platform using the transfusion assembly to further build the 3D part in a layer-by-layer manner, wherein the build platform centerline that extends in the in-track direction is offset from the centerline of the transfer medium while transfusing the second layer.

19. The method of claim 17, wherein the step of developing the first layer using at least one electrophotographic engine comprises developing a first region of the first layer using the part material developed by a first electrophotographic engine and developing a second region of the first layer using the support material developed by a second electrophotographic engine.

* * * * *